United States Patent [19]

Lösel

[11] Patent Number: 4,642,746
[45] Date of Patent: Feb. 10, 1987

[54] CIRCUIT ARRANGEMENT FOR FEEDING THE REGULATION AND CONTROL DEVICE OF A REGULATED DIRECT VOLTAGE CONVERTER

[75] Inventor: Walter Lösel, Fürth-Vach, Fed. Rep. of Germany

[73] Assignee: U.S. Philips Corporation, New York, N.Y.

[21] Appl. No.: 739,580

[22] Filed: May 30, 1985

[30] Foreign Application Priority Data

Jun. 7, 1984 [DE] Fed. Rep. of Germany ....... 3421133

[51] Int. Cl.⁴ ..................... H02J 11/00; H02P 13/00
[52] U.S. Cl. ..................................... 363/49; 323/299; 323/901
[58] Field of Search .............................. 363/49, 15–16, 363/95, 97, 123; 323/901, 299

[56] References Cited

U.S. PATENT DOCUMENTS 4,370,701 1/1983 Western ........................... 323/901 X
4,497,017 1/1985 Davis .................................... 363/49

FOREIGN PATENT DOCUMENTS 0172972 10/1983 Japan ...................................... 363/49

Primary Examiner—Peter S. Wong
Attorney, Agent, or Firm—Robert T. Mayer; Bernard Franzblau

[57] ABSTRACT

In a circuit arrangement for energizing the regulation and control device (RS) of a regulated direct voltage converter (GW), a charging capacitor which supplies the regulation and control device (RS) is charged during the starting stage by the input voltage (U1) of the direct voltage converter and during the operating condition by an auxiliary voltage (UH) at the secondary side of the converter (GW). The change-over takes place by means of a threshold value switch (S), which switches off a constant-current source (U1,IC) that can be switched on and off as soon as the voltage at the charging capacitor (C) exceeds by a given amount a reference voltage (Uref). The circuit arrangement exhibits particularly low losses during the operating condition of the direct voltage converter.

16 Claims, 2 Drawing Figures

CIRCUIT ARRANGEMENT FOR FEEDING THE REGULATION AND CONTROL DEVICE OF A REGULATED DIRECT VOLTAGE CONVERTER

This invention relates to a circuit arrangement for feeding the regulation and control device of a regulated direct voltage converter, which has the following features: when switching on the input voltage of the direct voltage converter, a first transistor is turned on and its emitter current charges a charging capacitor from which the regulation and control device is supplied; as soon as the direct voltage converter operates, it delivers a sufficiently large auxiliary voltage by which the charging capacitor is charged further via a first diode and consequently the first transistor is cut off.

Figure 1:
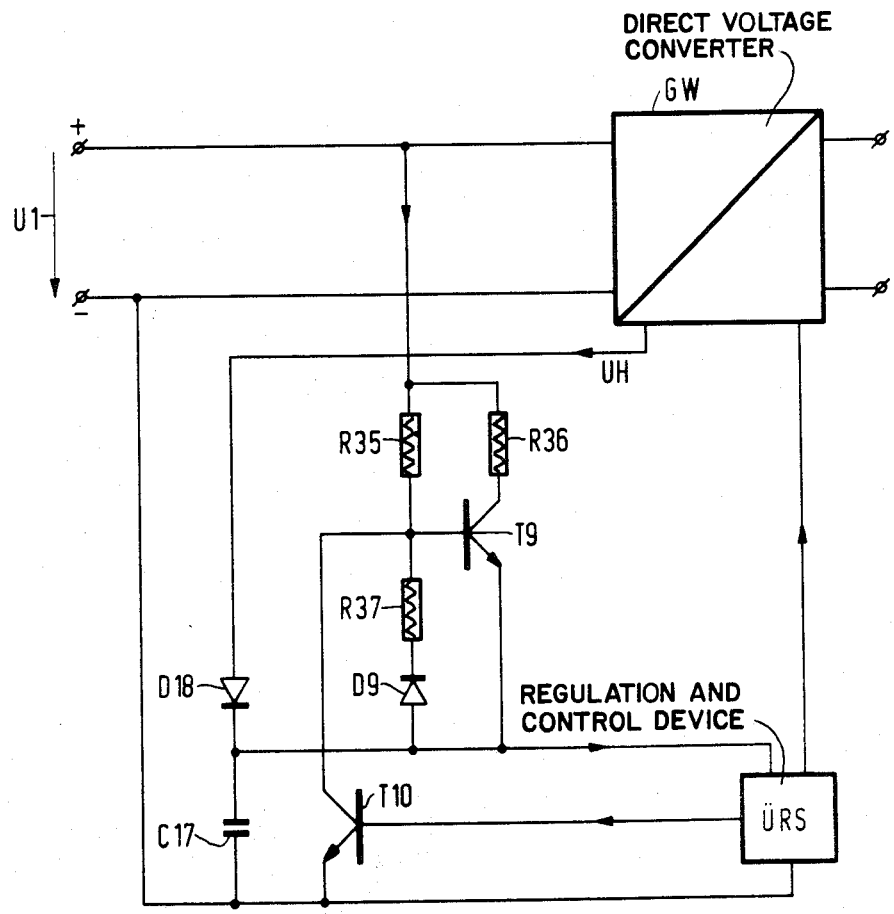

There is shown in the monograph "Schaltnetzteile" published by J. Wüstehube (cf, the article of Lütjens, H. W.: "Technisch-wirtschaftliche Gesichtspunkte bei'der Entwicklung und Fertigung am Beispiel eines 40-W-Durchflusswandler-Schaltnetzteils", in "Schaltnetzteile", Wüstshube, J.u.a., $2^{nd}$ edition VDE-Verlag, 1000 Berlin 12, 1982), on page 406 in FIG. 11.11 and on page 410 in FIG. 11.14 a circuit arrangement which comprises the circuit arrangement mentioned above as a sub-circuit. In FIG. 1 the features of the known circuit which are most important for the following considerations are represented.

The unregulated voltage $U_1$ is supplied to the primary side of a regulated direct voltage converter GW. The voltage $U_1$ is the AC supply voltage rectified by a supply voltage rectifier, not shown. In order to actuate the switching transistor of the direct voltage converter GW and to vary the duty cycle thereof, the associated elements, i.e. the regulator, the oscillator and further elements, which provide monitoring and protecting functions, must be supplied with a voltage. The said elements are indicated diagrammatically in FIG. 1 by a unit ÜRS. The unit ÜRS is supplied with voltage during the starting stage of the direct voltage converter GW., i.e. during a time interval not to be indicated further after it has been switched on, via the voltage $U_1$. If the direct voltage converter then operates and the unit ÜRS operates accordingly, its supply via the input voltage $U_1$ of the direct voltage converter is switched off and the further supply is taken over by an auxiliary voltage UH on the secondary side of the direct voltage converter GW. The condition now attained will be designated hereinafter as the operating condition of the direct voltage converter.

More particularly, the following processes are effected: if the input voltage $U_1$ increases after switching on, a transistor $T_9$ is turned on because of the potential conditions which are adjusted by resistors $R_{35}$, $R_{36}$ and $R_{37}$. The conductive transistor $T_9$ charges a charging capacitor $C_{17}$, from which the unit ÜRS is supplied. When the voltage at the charging capacitor $C_{17}$ reaches a threshold voltage—the associated monitoring circuit being a part of the unit ÜRS—, the transistor $T_9$ is closed by a transistor $T_{10}$ to such an extent that the voltage at the charging capacitor $C_{17}$ lies in the proximity of the threshold voltage. By means of the auxiliary voltage UH, which in the meantime has increased to its full value, the capacitor $C_{17}$ is charged through a diode $D_{18}$ to a value exceeding the threshold voltage. Consequently, the unit ÜRS turns the transistor $T_{10}$ full on. Thus, the transistor $T_9$ is cut off and the voltage supply of the unit ÜRS is effected only via the auxiliary voltage UH.

The change-over is effected in order to reduce the power dissipation connected with the charging of the charging capacitor $C_{17}$ via the input voltage $U_1$, which is generally very high. With a 220 V AC supply, the input voltage is of the order of 300 V and therefore a power dissipation of the order of, for example, a few Watts occurs in the resistor $R_{36}$, through which the charging current of the charging capacitor $C_{17}$ flows.

However, even in the case where the transistor $T_9$ is cut-off so that no current flows any longer through the resistor $R_{36}$, the current through the resistor $R_{35}$ and through the collector-emitter path of the transistor $T_{10}$ leads to losses, which may lie at 1 W. Further losses in the operating condition occur by virtue of the discharge of the charging capacitor $C_{17}$ via a diode $D_9$ and a resistor $R_{37}$. Such losses reduce the switching efficiency of the main part (GW), especially if low powers are to be transmitted.

An object of the invention is to provide a circuit arrangement for supplying the regulation and control device of a regulated direct voltage converter so that its losses during the operating condition are practically negligible.

This object is achieved in that a constant-current circuit is provided, which together with the voltage source for the input voltage of the direct voltage converter constitutes a constant-current source that can be switched on and off and between whose load terminals a first Zener diode is connected. The series arrangement of the base-emitter diode of the first transistor and of the charging capacitor is connected parallel to the first Zener diode. A threshold value switch is provided which switches the constant-current source on and off as soon as the voltage at the charging capacitor rises above and falls below the reference voltage produced by the first Zener diode by a predetermined amount. A reference voltage at the first Zener diode is maintained, even when the current source is switched off, by the current of a current path across which the input voltage of the direct voltage converter decreases and which includes a first high-ohmic resistor and the first Zener diode.

The circuit arrangement according to the invention affords the advantage that by the use of a current source, losses during the starting stage of the direct voltage converter increase only linearly with the input voltage $U_1$. According to the aforementioned prior art, on the contrary, the power dissipation increases quadratically with the input voltage.

During the operating condition of the direct voltage converter, the main losses occur at a first high-ohmic resistor which is included in a transverse branch of the input lead of the direct voltage converter. Because of the high resistance value of this resistor (more than 1 MΩ), even at voltages of 300 V the losses are less than 100 mW.

Advantageous embodiments are indicated in the Sub-claims.

Figure 2:
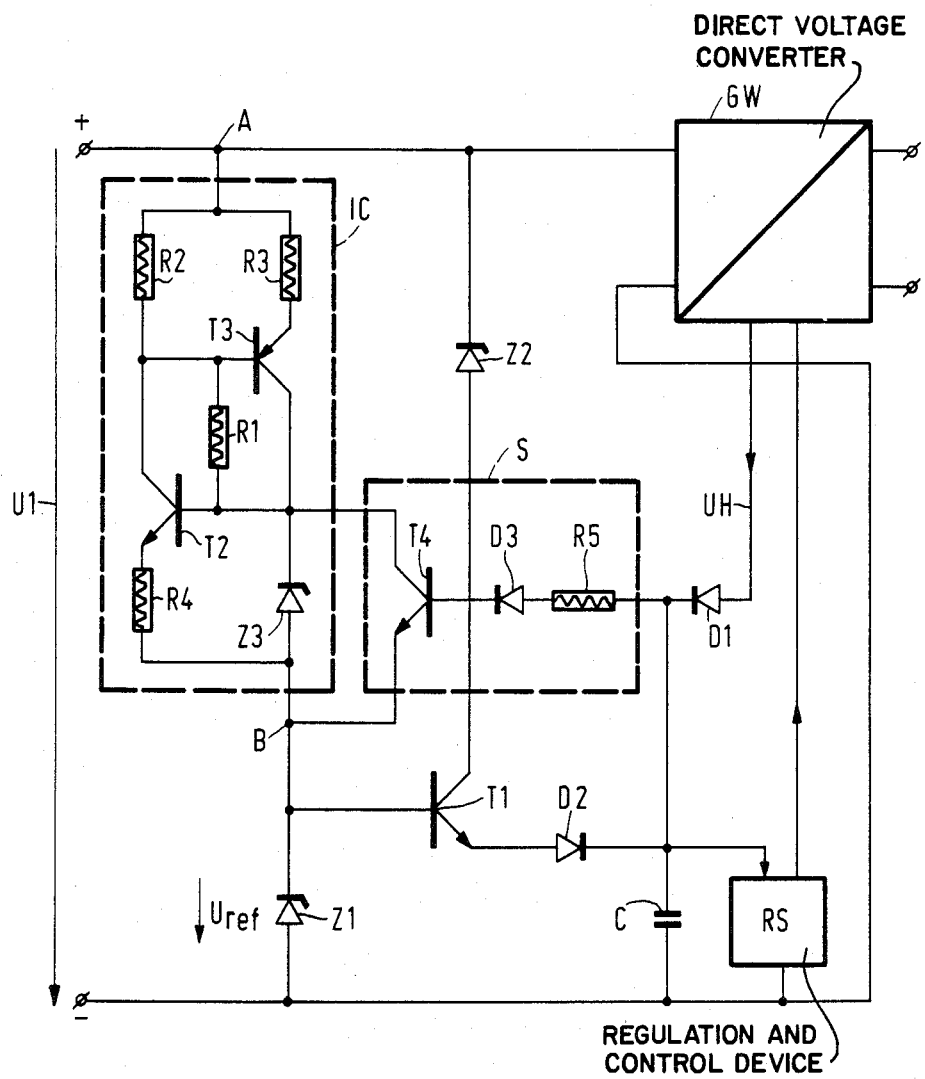

In order that the invention may be readily carried out, it will now be described more fully, by way of example, with reference to the accompanying drawing, in which:

FIG. 1 shows a circuit according to the prior art, and
FIG. 2 shows a circuit according to the invention.

In FIG. 1, the same reference numerals are used as in the FIG. 11.11 and in the FIG. 11.14 of the aforementioned publication in order to facilitate the illustration of the prior art given in the preamble of the description. In the explanation of FIG. 2, reference symbols between brackets will indicate which elements of FIGS. 1 and 2 are to be associated with each other. Elements and quantities, which are denoted in FIGS. 1 and 2 by the same reference symbols, also have the same functions.

In FIG. 2, a voltage source (not shown) supplies the input voltage $U_1$ for a regulated direct voltage converter GW. Together with the voltage source not shown, a bipole, which is designated hereinafter as a constant-current circuit IC, constitutes a constant-current source $U_1$, IC that can be switched on and off. A connection A of the bipole is connected to the positive terminal of the voltage source, not shown. The negative terminal of this voltage source and the second connection B of the bipole constitute the load terminals of the constant-current source $U_1$, IC that can be switched on and off.

A Zener diode $Z_1$ is connected between the load terminals. A series arrangement of the base-emitter diode of a transistor $T_1$ ($T_9$), of a diode $D_2$ and of a charging capacitor C ($C_{17}$), which feed the regulation and control device RS of the direct voltage converter GW, is connected parallel to the Zener diode $Z_1$. The collector of the transistor $T_1$ is connected via a Zener diode $Z_2$ to the connection A of the constant-current circuit IC. The diode $D_2$ should ensure that the transistor $T_1$ does not operate in the inverse mode.

When the voltage $U_1$ is switched on, the constant-current source $U_1$, IC is also fully switched on provided that the voltage $U_1$ has exceeded a value more accurately indicated below. The reference voltage $U_{ref}$ produced by the current of the constant-current source $U_1$, IC at the Zener diode $Z_1$ ensures that the transistor $T_1$ can be mode conductive. The said transistor is not actually conductive and hence the charging capacitor C is not charged, however, until the voltage $U_1$ has increased to a level such that the Zener diode $Z_2$ also becomes conductive.

The Zener diode $Z_2$ ensures that the direct voltage converter GW either does not operate at all or operates perfectly. The perfect operation requires that the input voltage $U_1$ exceeds a minimum voltage $U_{1m}$ and the supply voltage UC for the regulation and control device RS exceeds a minimum voltage UCm. For example, if the voltage UC is smaller than the minimum voltage UCm, UCm is about 8 V, the oscillator included in the regulation and control device RS does not start. If the input voltage $U_1$ is smaller than the minimum voltage $U_{1m}$, the direct voltage converter cannot stabilize its output voltage on the desired nominal value (U1m depends inter alia upon the nominal value of the output voltage). If, therefore, the Zener voltage of the Zener diode $Z_2$ is chosen to be larger than U1m-UCm-US-UD, US being the saturation voltage of the transistor $T_1$ and UD being the forward voltage of the diode $D_2$, the voltage UCm can be attained only if the input voltage U1 exceeds the voltage U1m.

The process of charging the charging capacitor C via the transistor $T_1$ is terminated when the voltage UC at the capacitor C reaches a value 2UD—(UD represents in this case the approximate forward voltage of a diode)—below the reference voltage $U_{ref}$. In fact, the transistor $T_1$ is then cut off. If the voltage at the charging capacitor C decreases, the transistor $T_1$ is turned on again and the capacitor C is recharged.

During the operation of the direct voltage converter GW, the amplitude of an auxiliary voltage derived from a transmitter winding on the secondary side of the converter GW increases to such an extent that the charging capacitor C can be charged further via a diode $D_1$ ($D_{18}$) so that its voltage UC exceeds the reference voltage $U_{ref}$. When the voltage at the charging capacitor C exceeds the reference voltage by 2UD, the threshold value switch S comprising a resistor $R_5$, a diode $D_3$ and a transistor $T_4$ switches off the constant-current source $U_1$, IC. The direct voltage converter GW now operates in the active mode.

The threshold value switch S is constructed so that the emitter of the transistor $T_4$ is connected to the cathode of the Zener diode $Z_1$ and the base is connected through the diode $D_3$ and the resistor $R_3$ to the cathode of the diode $D_1$. The resistor $R_5$ serves to limit the base current of the transistor $T_4$. The losses occurring at this transistor are only a few mW because of its resistance value and the small voltage difference.

The constant-current source $U_1$, IC is switched off in that the conducting collector-emitter path of the transistor $T_4$ shortcircuits a Zener diode $Z_3$, which forms a part of the constant-crrent circuit IC.

The constant-current source IC in the form of a bipole comprises four resistors $R_1$, $R_2$, $R_3$, $R_4$, the Zener diode $Z_3$, an npn transistor $T_2$ and a pnp transistor $T_3$. A first current path leads from the connection A of the constant-current circuit via the resistor $R_2$, the collector and the emitter of the transistor $T_2$ and the resistor $R_4$ to the connection B. A second current path from the connection A to the connection B extends via the resistor $R_3$, the emitter and the collector of the transistor $T_3$ and the Zener diode $Z_3$. The collector of the transistor $T_2$ is connected to the base of the transistor $T_3$ and the collector of the transistor $T_3$ is connected to the base of the transistor $T_2$. The high-ohmic resistor $R_1$ is arranged between the bases of the transistors $T_2$ and $T_3$.

In the starting stage (so when transistor $T_4$ is cut off) with an increasing voltage $U_1$ an also increasing current flows through the resistors $R_2$, $R_1$ and the Zener diodes $Z_3$ and $Z_1$. The voltage which thus builds up at the Zener diode $Z_3$ produces conduction in the transistor $T_2$. Since the conductive transistor $T_2$ reduces the base potential of the transistor $T_3$, the latter is also turned on. Because of the conductive transistors $T_2$ and $T_3$, the current through the constant-current circuit IC increases until the full breakdown voltage appears across the diodes $Z_1$ and $Z_3$. The maximum current is defined by the value of the breakdown voltage of the Zener diode $Z_3$ and by the values of the resistors $R_2$, $R_3$ and $R_4$. It is reached only when the input voltage $U_1$ exceeds the sum of the breakdown voltages of the diodes $Z_1$ and $Z_3$.

When the transistor $T_4$ is conductive, the transistor $T_2$ and subsequently the transistor $T_3$ are cut off. Thus, the constant-current source $U_1$, IC is switched off. Current then flows only through the current path comprising the resistors $R_2$ and $R_1$, the collector-emitter path of the transistor $T_4$ and the Zener diode $Z_1$. Because of the high resistance value (more than 1 MΩ) of the resistor $R_1$, this current is of the order of 100 μA and serves to maintain a reference voltage $U_{ref}$ at the Zener diode $Z_1$ so that, if the auxiliary voltage UH fails or drops in value, the constant-current source U1, IC is switched on again and the charging capacitor C is charged via the input voltage U1. When the constant-current source U1, IC is switched off, i.e. during the operating condition, the current through the resistor $R_1$ causes the only appreciable losses, with a maximum value of approximately 100 mW.

What is claimed is:

1. A circuit arrangement for energizing a regulation and control device of a regulated direct voltage converter, comprising:
   (a) a first transistor that is turned on when the input voltage of the direct voltage converter is switched on whereby emitter current of said transistor charges a charging capacitor, said capacitor supplying the regulation and control device;
   (b) as soon as the direct voltage converter operates, it supplies a sufficiently large auxiliary voltage with which the charging capacitor is charged further via a first diode thereby to cut-off the first transistor,
   (c) a constant-current circuit which, together with the voltage source for the input voltage of the direct voltage converter constitutes a constant-current source that can be switched on and off and between whose load terminals a first Zener diode is coupled, the series arrangement of the base-emitter diode of the first transistor and the charging capacitor being connected parallel to the first Zener diode;
   (d) a threshold value switch respectively which switches off and on the constant-current source when the voltage at the charging capacitor exceeds or falls below by a given amount the reference voltage produced by the first Zener diode; and
   (e) a reference voltage being maintained at the first Zener diode, even when the current source is switched off, by means of a current in a current path which comprises a first high-ohmic resistor and the first Zener diode coupled to the input voltage of the direct voltage converter.

2. A circuit arrangement as claimed in claim 1, further comprising a second Zener diode connected in a collector lead of the first transistor, the Zener voltage of the second Zener diode being chosen so that the voltage at the charging capacitor reaches a minimum voltage required for the starting of the regulation and control device only when the input voltage of the direct voltage converter exceeds a minimum value necessary for reliable operation.

3. A circuit arrangement as claimed in claim 2, further comprising a second diode connected to the emitter lead of the first transistor in order to prevent inverse operation of the first transistor.

4. A circuit arrangement as claimed in claim 1 wherein the constant-current circuit comprises: a bipole having a first connection connected to a positive terminal of the voltage source for the input voltage of the direct voltage converter and having a second connection connected to the cathode of the first Zener diode,
   a first current path from the first connection of the bipole through a second resistor, through the collector and the emitter of a second transistor of the npn type, and through a fourth resistor to the second connection of the bipole;
   a second current current path from the first connection of the bipole through a third resistor, through the emitter and the collector of a third transistor of the pnp type, and through a third Zener diode to the second connection of the bipole;
   the collector of the second transistor being connected to the base of the third transistor and the base of the second transistor being connected to the collector of the third transistor;
the bases of the second and third transistors being connected to each other through the first high-ohmic resistor.

5. A circuit arrangement as claimed in claim 4, characterized in that the threshold value switch comprises; a fourth transistor of the npn type, a third diode and a fifth resistor, means connecting the collector of the fourth transistor to the cathode of the third Zener diode and its emitter to the cathode of the first Zener diode, means connecting the base of the fourth transistor to the cathode of the third diode and the anode of the third diode through the fifth resistor to the cathode of the first diode.

6. A circuit arrangement as claimed in claim 1 further comprising a second diode connecting the emitter of the first transistor to said charging capacitor.

7. A circuit arrangement as claimed in claim 2 wherein the constant-current circuit comprises:
   first and second terminals connected to one terminal of an input voltage source of the converter and one terminal of the first Zener diode, respectively,
   means connecting a second resistor, a second transistor and a fourth resistor in a first series circuit between said first and second terminals of the constant-current circuit,
   means connecting a third resistor, a third transistor of opposite conductivity to that of the second transistor and a third Zener diode in a second series circuit between said first and second terminals,
   means connecting a collector of the second transistor to a base of the third transistor and a base of the second transistor to a collector of the third transistor, and
   means connecting the base of the second transistor to the base of the third transistor via said first high-ohmic resistor.

8. A circuit for energizing a regulation and control device of a regulated direct voltage converter comprising:
   first and second input terminals for supplying a DC input voltage to the direct voltage converter,
   a capacitor coupled to the regulation and control device for supplying an energizing voltage thereto,
   a first transistor coupled to the input terminals and to said capacitor so as to supply a charge current to the capacitor when the DC input voltage at said input terminals is turned on,
   said direct voltage converter in operation supplying an auxiliary voltage to the capacitor via a first diode and of a magnitude to cut-off the first transistor,
   a constant-current circuit coupled to the input terminals to form therewith a constant current source that can be switched on and off,
   a Zener diode coupled between load terminals of the constant current source so as to derive a reference voltage,
   means serially connecting the base-emitter junction of the first transistor and the capacitor in parallel with the Zener diode,
   a threshold switch coupled to the constant current circuit and the capacitor and operative to switch the constant current source on and off when the capacitor voltage increases or decreases by a given amount above or below the reference voltage of the Zener diode, and a high-ohmic resistor coupling the Zener diode to said input terminals to provide a current path for the Zener diode when the current source is switched off thereby to maintain the reference voltage across the Zener diode.

9. A circuit as claimed in claim 8 further comprising: a second Zener diode coupled in series with the first transistor and the capacitor to said first and second input terminals so that current flow in said first transistor is blocked if the input voltage is below a given level necessary to produce reliable operation of the regulated direct voltage converter.

10. A circuit as claimed in claim 8 wherein the constant-current circuit comprises:
 first and second terminals connecting the constant-current circuit in series with the first Zener diode across the first and second input terminals,
 a first current path between the first and second terminals which includes a second transistor,
 a second current path between the first and second terminals which includes a third transistor and a second Zener diode connected in series circuit, said second and third transistors being of opposite conductivity types,
 means connecting the base and collector of one of said second and third transistors to the collector and base, respectively, of the other one of said second and third transistors, and
 means connecting the base of the second transistor to the base of the third transistor via the high-ohmic resistor.

11. A circuit as claimed in claim 8 further comprising:
 a second Zener diode coupled in series with the first transistor and the capacitor to said first and second input terminals, and wherein the threshold switch comprises:
 a second transistor having a collector connected to a circuit point in the constant current circuit and an emitter connected to the first Zener diode, and
 means connecting the base of the second transistor to a junction point between the first diode and the capacitor whereby the capacitor voltage controls conduction of the second transistor.

12. A circuit as claimed in claim 8 wherein the constant current circuit comprises:
 a further transistor connected in series circuit with a further Zener diode between one input terminal and one terminal of the first Zener diode, and the threshold switch comprises:
 a second transistor connected in parallel with the further Zener diode, and
 means connecting a base electrode of the second transistor to said capacitor whereby the capacitor voltage controls conduction of the second transistor.

13. A circuit as claimed in claim 8 further comprising:
 a second diode connected in series circuit with the first transistor and the capacitor across said first and second input terminals.

14. A circuit for energizing a regulated direct voltage converter comprising:
 first and second input terminals for supplying a DC input voltage to the direct voltage converter,
 a regulation and control device having an output control terminal coupled to said direct voltage converter,
 a capacitor coupled to the regulation and control device for supplying an energizing voltage thereto,
 a first transistor coupled to the input terminals and to said capacitor so as to supply a charge current to the capacitor when a DC input voltage is applied to the input terminals,
 a voltage-threshold breakdown device,
 a switchable constant current circuit connected in series with said breakdown device across the input terminals so as to derive a reference voltage across the breakdown device,
 means connecting the base-emitter junction of the first transistor in series circuit with the capacitor and the series circuit in parallel with the breakdown device,
 means for supplying an auxiliary voltage from the direct voltage converter to the capacitor via a first diode and of a magnitude sufficient to cut-off the first transistor,
 a threshold switch coupled to the constant current circuit and to the capacitor and operative to switch the constant current circuit off when the capacitor voltage increases by a given amount above the reference voltage of the breakdown device, and
 a high-ohmic resistor coupling the breakdown device to said input terminals so as to provide a current path for the breakdown device when the constant current circuit is switched off thereby to maintain the reference voltage across the breakdown device.

15. A circuit as claimed in claim 14 further comprising:
 a second voltage-threshold breakdown device connected in series circuit with the first transistor and the capacitor to said first and second input terminals so as to inhibit current flow through the first transistor when the input voltage across said first and second input terminals is below a given voltage level.

16. A circuit as claimed in claim 15 wherein said first and second voltage-threshold breakdown devices comprise first and second Zener diodes, respectively.

* * * * *